United States Patent
Takashima et al.

(10) Patent No.: US 12,238,756 B2
(45) Date of Patent: Feb. 25, 2025

(54) COMMUNICATION METHOD, COMMUNICATION SYSTEM, AND STORAGE MEDIUM

(71) Applicant: TOYOTA JIDOSHA KABUSHIKI KAISHA, Toyota (JP)

(72) Inventors: Toru Takashima, Susono (JP); Takahiro Ogawa, Okazaki (JP); Kenji Tadakuma, Toyota (JP); Keisuke Miwa, Toyota (JP); Shuichi Tamagawa, Kitanagoya (JP); Takahiro Okano, Chiryu (JP); Shun Ota, Susono (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 323 days.

(21) Appl. No.: 17/815,346

(22) Filed: Jul. 27, 2022

(65) Prior Publication Data
US 2023/0062961 A1 Mar. 2, 2023

(30) Foreign Application Priority Data
Aug. 31, 2021 (JP) .................................. 2021-141087

(51) Int. Cl.
*H04W 72/56* (2023.01)
(52) U.S. Cl.
CPC .................................. *H04W 72/56* (2023.01)
(58) Field of Classification Search
CPC ... H04W 72/56; H04W 4/40; H04W 28/0226; H04W 28/0231; H04W 28/24; H04L 47/24; H04L 67/12
See application file for complete search history.

(56) References Cited

U.S. PATENT DOCUMENTS

| 11,215,982 | B2 | 1/2022 | Urano et al. |
| 2017/0078209 | A1* | 3/2017 | Miklós ................... H04L 47/29 |
| 2019/0137999 | A1 | 5/2019 | Taguchi et al. |
| 2020/0007398 | A1* | 1/2020 | Gaikwad ............. H04L 41/0894 |
| 2021/0016795 | A1 | 1/2021 | Matsushita et al. |
| 2021/0016799 | A1 | 1/2021 | Matsushita et al. |
| 2021/0027625 | A1 | 1/2021 | Jung et al. |
| 2021/0041894 | A1 | 2/2021 | Urano et al. |
| 2021/0055741 | A1 | 2/2021 | Kawanal et al. |
| 2021/0058173 | A1 | 2/2021 | Otaki et al. |
| 2021/0072743 | A1 | 3/2021 | Otaki et al. |
| 2021/0099938 | A1 | 4/2021 | Otaka |
| 2021/0325871 | A1 | 10/2021 | Taguchi et al. |

FOREIGN PATENT DOCUMENTS

| JP | 2006-311520 A | 11/2006 |
| JP | 2010-061346 A | 3/2010 |
| WO | WO 2019/240238 A1 | 12/2019 |

* cited by examiner

Primary Examiner — Chi H Pham
Assistant Examiner — Raul Rivas
(74) *Attorney, Agent, or Firm* — Finnegan, Henderson, Farabow, Garrett, and Dunner, LLP

(57) ABSTRACT

A communication method of the present disclosure includes detecting or estimating a decrease in throughput of a first communication terminal mounted on a first vehicle that is remotely driven, and reducing a communication speed of a second communication terminal with which the first communication terminal shares a communication resource in response to detection or estimation of the decrease in the throughput.

9 Claims, 3 Drawing Sheets

COMMUNICATION METHOD, COMMUNICATION SYSTEM, AND STORAGE MEDIUM

CROSS-REFERENCE TO RELATED APPLICATION

This application claims priority to Japanese Patent Application No. 2021-141087 filed on Aug. 31, 2021, incorporated herein by reference in its entirety.

BACKGROUND

1. Technical Field

The present disclosure relates to a communication method, a communication system, and a storage medium suitable for use in mobile communication in an environment in which a remote driving vehicle is remotely driven.

2. Description of Related Art

Japanese Unexamined Patent Application Publication No. 2010-061346 (JP 2010-061346 A) describes a technique related to remote driving of a mobile body such as an unmanned vehicle. In the technique described in JP 2010-061346 A, performing remote operations of the mobile body intuitively and accurately even at a high moving speed is an issue. As measures for solving this issue, in the technique described in JP 2010-061346 A, first, communication delay time between the mobile body and a remote operation device is estimated. Next, based on a movement path of the mobile body from when an image of a movement area is acquired to when required time elapses, and the estimated delay time, the position of the mobile body at the time when the remote operation device controls the mobile body is estimated. Then, a turning operation reference point corresponding to the estimated position of the mobile body is displayed on a display unit.

However, the technique described in JP 2010-061346 A is a technique based on the premise that there is a communication delay between the mobile body and the remote operation device, and does not suppress the communication delay itself. Further, JP 2010-061346 A does not describe suppressing a decrease in throughput, which is an important performance as well as a communication delay in remote driving.

SUMMARY

The present disclosure has been made in view of the above-mentioned issue. An object of the present disclosure is to provide a technique for suppressing a decrease in throughput during remote driving of a vehicle.

The present disclosure provides a communication method. The communication method of the present disclosure includes detecting or estimating a decrease in throughput of a first communication terminal mounted on a first vehicle that is remotely driven; and reducing a communication speed of a second communication terminal with which the first communication terminal shares a communication resource in response to detection or estimation of the decrease in the throughput.

The present disclosure may include, in the communication method, reducing the communication speed of the second communication terminal is stopping communication of the second communication terminal.

In the communication method of the present disclosure, the second communication terminal may be a communication terminal mounted on a vehicle that is not remotely driven.

Further, in the communication method of the present disclosure, the second communication terminal may be a communication terminal mounted on a second vehicle that is remotely driven, and the first vehicle may be a vehicle having a higher communication priority than the second vehicle. In this case, the communication resource may be allocated between the first vehicle and the second vehicle according to the communication priority. The communication priority may be high as delay allowance for usage of the vehicle is low, may be high as a charge class of the vehicle is high, and may be high as a vehicle speed of the vehicle is high.

The present disclosure provides a communication system. The communication system of the present disclosure includes at least one memory that stores at least one program; and at least one processor connected to the at least one memory. The at least one program is configured to cause the at least one processor to execute detecting or estimating a decrease in throughput of a first communication terminal mounted on a first vehicle that is remotely driven; and reducing a communication speed of a second communication terminal with which the first communication terminal shares a communication resource in response to detection or estimation of the decrease in the throughput.

Further, the present disclosure provides a storage medium storing a program. The program according to the present disclosure is configured to cause a computer to execute detecting or estimating a decrease in throughput of a first communication terminal mounted on a first vehicle that is remotely driven; and reducing a communication speed of a second communication terminal with which the first communication terminal shares a communication resource in response to detection or estimation of the decrease in the throughput.

According to the communication method, the communication system, and the storage medium of the present disclosure, when the decrease in the throughput of the first communication terminal mounted on the first vehicle that is remotely driven occurs, the communication speed of the second communication terminal with which the first communication terminal shares the communication resource is reduced. When the communication speed of the second communication terminal is reduced, a margin is generated in the communication resource, and the decrease in the throughput of the first communication terminal is eliminated or alleviated. That is, according to the technique of the present disclosure, it is possible to suppress the decrease in the throughput during remote driving of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. However, when the number, quantity, amount, range, etc. of each element are referred to in the embodiment shown below, the idea of the present disclosure is not limited to the numbers mentioned herein except when explicitly stated or when clearly specified by the number in principle. In addition, the structures and the like described in the embodiments shown below are not necessarily essential to the idea of the present disclosure, except when explicitly stated or when clearly specified in principle.

1. First Embodiment 1-1. Configuration of Communication System

Figure 1:
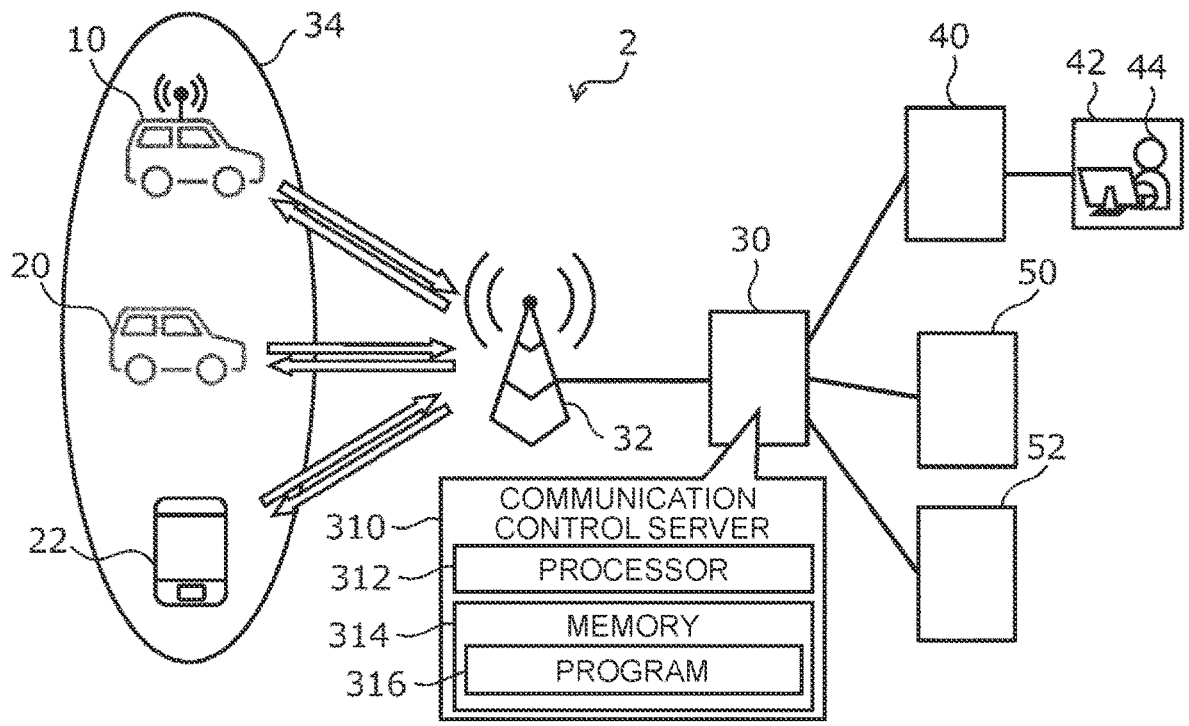
FIG. 1 is a schematic diagram showing a configuration of a communication system according to a first embodiment of the present disclosure.

FIG. 1 is a schematic diagram showing a configuration of a communication system according to a first embodiment. A communication system 2 is a wireless communication system used for communication for remote driving of a remote driving vehicle 10. The remote driving vehicle 10 is provided with a communication terminal and performs wireless communication with a base station 32. The base station 32 can communicate with not only the remote driving vehicle 10 but also a normal vehicle 20 (vehicle that is not a remote driving vehicle) including a communication terminal and a mobile communication terminal such as a smartphone 22 as long as these are in a communication area 34 where radio waves of the base station 32 reach. In the present embodiment, the remote driving vehicle 10 corresponds to a first vehicle, and a communication terminal included in the remote driving vehicle 10 corresponds to a first communication terminal. Further, the communication terminal included in the vehicle 20 and the smartphone 22 correspond to a second communication terminal.

The base station 32 is connected to a telecommunications carrier 30 that provides a wireless communication service. The wireless communication service provided by the telecommunications carrier 30 is, for example, fourth generation (4G), long term evolution (LTE), fifth generation (5G), or the like. Various service providers that provide services to users using wireless communication transmit and receive information via the telecommunications carrier 30. In FIG. 1, in addition to a remote driving center 40 that provides a remote driving service, a connected service center 50 and a video distributor 52 are shown as service providers, for example.

The remote driving center 40 connects a remote cockpit 42 and the remote driving vehicle 10 that is a user. A remote operator 44 remotely drives the remote driving vehicle 10 from the remote cockpit 42. In the upstream communication from the remote driving vehicle 10 to the remote cockpit 42, various kinds of information including a camera image around the remote driving vehicle 10 captured by an on-board camera, sound around the remote driving vehicle 10 collected by an on-board microphone, and a vehicle state (vehicle speed, presence or absence of failure, etc.) of the remote driving vehicle 10 are transmitted. In the downstream communication from the remote cockpit 42 to the remote driving vehicle 10, a steering wheel angle, an accelerator operation amount, a brake operation amount, and operation information on a turn signal are transmitted. In the communication between the remote cockpit 42 and the remote driving vehicle 10, the upstream communication has a larger traffic volume than the downstream communication. In particular, the traffic volume of the camera image is dominant in the upstream communication.

The connected service center 50 provides various services for safe driving and comfortable driving to the vehicle 20 that is a user. For example, services such as remote management of the state of the vehicle 20 by communication, updating of map information of a navigation system of the vehicle 20, and navigation by real-time information are provided. In the communication between the connected service center 50 and the vehicle 20, the downstream communication in which the map information is downloaded has a larger traffic volume than the upstream communication.

The video distributor 52 distributes various kinds of information including video contents and images to the smartphone 22 that is a user. Distribution of the video contents and the images is performed in response to a request from the smartphone 22. Further, a video or an image may be uploaded from the smartphone 22 to the video distributor 52. However, in the communication between the video distributor 52 and the smartphone 22, the downstream communication including a large amount of video contents and images has a larger traffic volume than the upstream communication. The video contents and the images from the video distributor 52 can be distributed to the communication terminal of the vehicle 20 or to the communication terminal of the remote driving vehicle 10.

The communication between the users 10, 20, and 22 and the service providers 40, 50, and 52 is controlled by a communication control server 310 of the telecommunications carrier 30. The communication control server 310 may be provided in a facility of the telecommunications carrier 30, or may be provided in a cloud. As an example, the communication control server 310 includes a processor 312 and a memory 314 connected to the processor 312. The memory 314 stores a program 316 that can be executed by the processor 312 and various kinds of information related to the program 316. The program is an example of a storage medium. The program 316 is executed by the processor 312, so that various functions for managing the communication system 2 and controlling the communication state are realized in the communication control server 310.

1-2. Communication Method

In the communication system 2 having the above configuration, the remote driving vehicle 10 shares a communication resource with other communication terminals such as the normal vehicle 20 and the smartphone 22. Specifically, when the remote driving vehicle 10, the normal vehicle 20, and the smartphone 22 are in the same communication area 34, a communication capacity of the base station 32 forming the communication area 34 is shared between the remote driving vehicle 10, the normal vehicle 20, and the smartphone 22.

However, the communication capacity of the base station 32 is finite. When the traffic volume of information to be transmitted exceeds the communication capacity of the base station 32, a communication environment in the communication area 34 deteriorates due to the tight communication resource. As a result, transmission of information required for remote driving of the remote driving vehicle 10 may be delayed, which may cause a difficulty in remote driving. For example, a difference between a behavior of the remote driving vehicle 10 and a timing of determination of the remote operator 44 with respect to the behavior of the remote driving vehicle 10 occurs as the time delay until the camera image of the on-board camera is transmitted to the remote cockpit 42 is large. Further, it becomes difficult to control movement of the remote driving vehicle 10 by remote driving as the time delay until the information on the steering wheel operation of the remote cockpit 42 is transmitted to the remote driving vehicle 10 is large.

When the difficulty in remote driving increases due to the deterioration of the communication environment, the remote operator 44 in the remote cockpit 42 has no choice but to reduce the vehicle speed of the remote driving vehicle 10. Further, depending on the deterioration of the communication environment, it may be difficult to continue remote driving in the first place, and the remote driving vehicle 10 may have to be stopped. Therefore, in the communication area 34 in which the remote driving vehicle 10 participates, it is desired to provide a good communication environment for the remote driving vehicle 10.

The communication method according to the present embodiment is a communication method executed by the communication system 2 configured as described above, and is executed for the purpose of suppressing a decrease in throughput of the remote driving vehicle 10 during remote driving. Hereinafter, the communication method according to the present embodiment will be specifically described with reference to FIGS. 2 and 3.

In the communication method according to the present embodiment, first, the decrease in the throughput of the remote driving vehicle 10 is detected. The decrease in the throughput of the remote driving vehicle 10 specifically means a decrease in throughput of the communication terminal mounted on the remote driving vehicle 10. In the example shown in FIG. 2, in step S11A, the decrease in the throughput is detected by the communication terminal mounted on the remote driving vehicle 10. A throughput calculation method is not limited. For example, the throughput may be calculated using a measurement result of round-trip time (RTT). In step S12A, a detection result is transmitted from the remote driving vehicle 10 to the remote driving center 40 in response to detection of the decrease in the throughput. Then, in step S13A, the decrease in the throughput is transmitted from the remote driving center 40 to the telecommunications carrier 30.

In the communication method according to the present embodiment, the decrease in the throughput of the remote driving vehicle 10 is also estimated. When the throughput decreases in the remote driving vehicle 10, the throughput also decreases in the remote cockpit 42 communicating with the remote driving vehicle 10. Further, when the throughput decreases in the remote driving vehicle 10, the throughput also decreases in the normal vehicle 20 and the smartphone 22 that share the communication resource with the remote driving vehicle 10. That is, the decrease in the throughput in the remote cockpit 42 and the decrease in the throughput of other communication terminals in the communication area 34 are detected, so that the decrease in the throughput of the remote driving vehicle 10 can be estimated.

Figure 2:
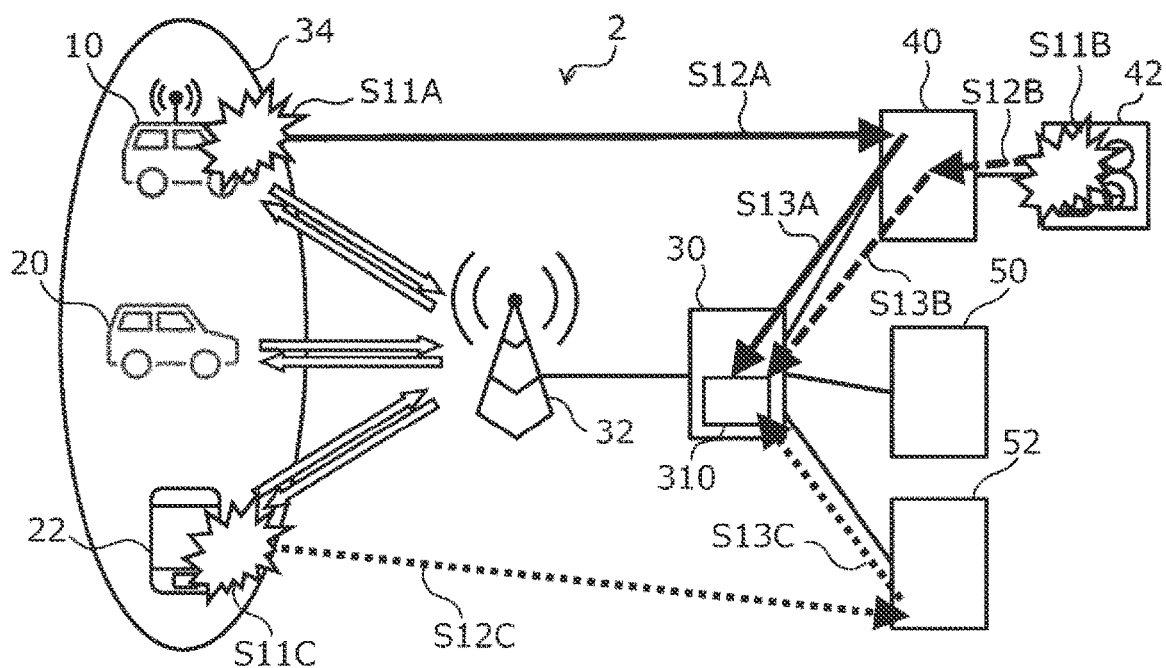
FIG. 2 is a diagram illustrating a communication method according to the first embodiment of the present disclosure.

In the example shown in FIG. 2, in step S11B, the decrease in throughput is detected by the remote cockpit 42. In step S12B, a detection result is transmitted from the remote cockpit 42 to the remote driving center 40 in response to detection of the decrease in the throughput. Then, in step S13B, the decrease in the throughput is transmitted from the remote driving center 40 to the communication control server 310 of the telecommunications carrier 30. Further, in the example shown in FIG. 2, in step S11C, the decrease in the throughput is detected by the smartphone 22 in the communication area 34. In step S12C, a detection result is transmitted from the smartphone 22 to the video distributor 52 in response to detection of the decrease in the throughput. Then, in step S13C, the decrease in the throughput is transmitted from the video distributor 52 to the communication control server 310.

As described above, in the present embodiment, the detection or the estimation of the decrease in the throughput of the remote driving vehicle 10 is transmitted to the communication control server 310. In order to increase the reduced throughput of the remote driving vehicle 10 again, it is effective to reduce the traffic volume other than that of the remote driving vehicle 10 in the communication area 34. When the traffic volume is reduced, a margin is generated in the communication resource, and the decrease in the throughput of the remote driving vehicle 10 is eliminated or at least alleviated. Therefore, the communication control server 310 requests the service providers other than the remote driving center 40 to cooperate such that the communication resource is transferred to the remote driving vehicle 10.

Figure 3:
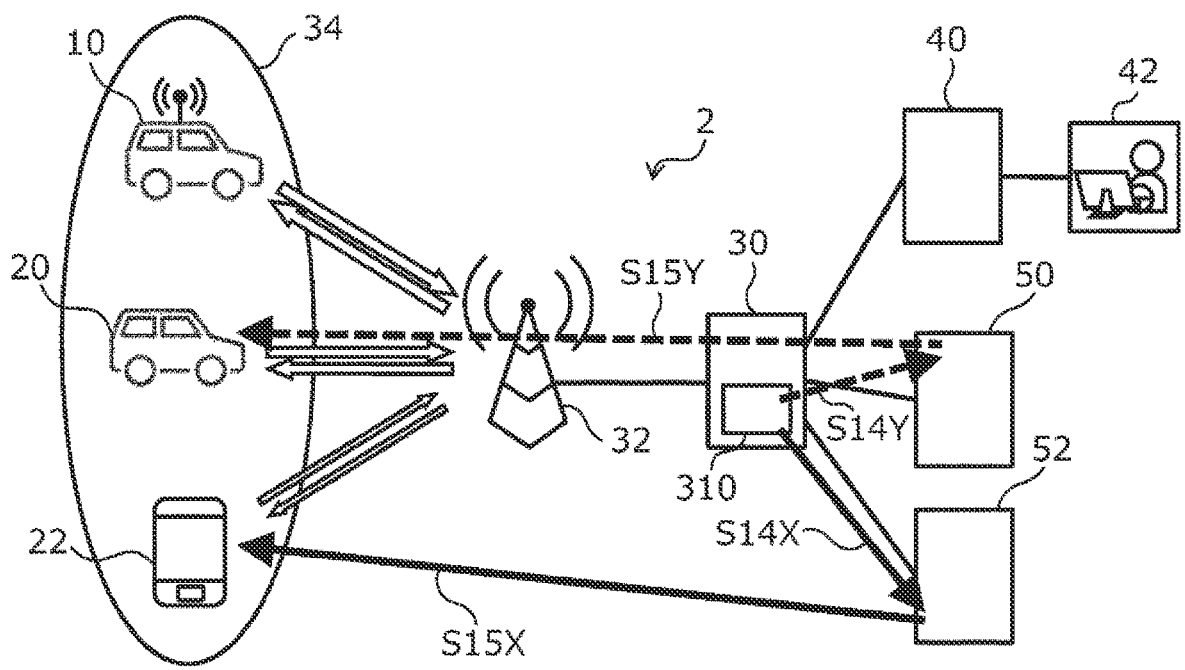
FIG. 3 is a diagram illustrating the communication method according to the first embodiment of the present disclosure.

In the example shown in FIG. 3, in step S14X, the communication control server 310 issues a cooperation request to the video distributor 52. In step S15X, the video distributor 52 reduces the communication speed between the video distributor 52 and the smartphone 22 in response to the cooperation request from the communication control server 310. Specifically, the speed of the video stream distributed in response to the request from the smartphone 22 is reduced or the compression rate is increased. Further, in the example shown in FIG. 3, in step S14Y, the communication control server 310 issues a cooperation request to the connected service center 50. In step S15Y, the connected service center 50 temporarily stops the communication between the connected service center 50 and the vehicle 20 in response to the cooperation request from the communication control server 310. For example, download of map information to the navigation system is temporarily stopped.

When the above process is performed, the margin is generated in the communication resource, and the decrease in the throughput of the remote driving vehicle 10 is eliminated or alleviated. That is, with the communication method according to the present embodiment, it is possible to suppress the decrease in the throughput of the remote driving vehicle 10 during remote driving. It should be noted that what kind of cooperation request the communication control server 310 issues to which service provider may be determined depending on the degree of the decrease in the throughput of the remote driving vehicle 10 that actually occurs. In the example shown in FIG. 3, when the decrease in the throughput is not so large, the cooperation request may not be issued to the connected service center 50, and when the decrease in the throughput is extremely large, the request for stopping the video distribution may be issued to the video distributor 52.

2. Second Embodiment

2-1. Configuration of Communication System

Figure 4:
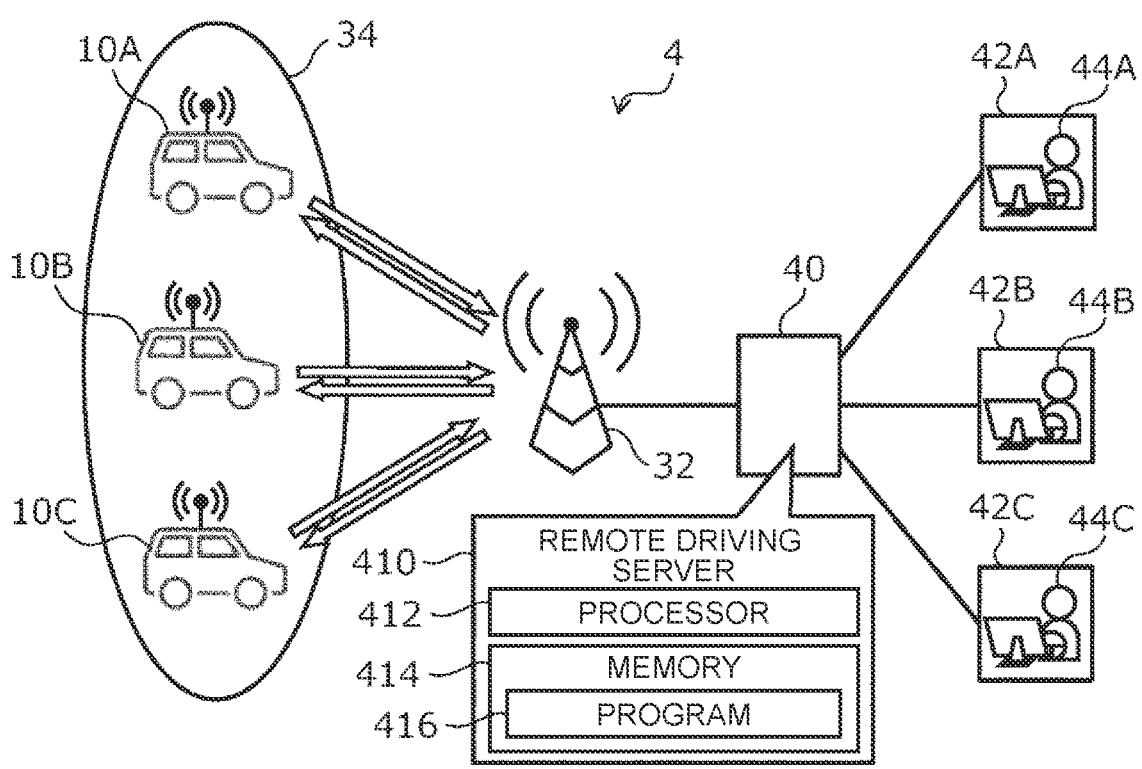
FIG. 4 is a schematic diagram showing a configuration of a communication system according to a second embodiment of the present disclosure.

FIG. 4 is a schematic diagram showing a configuration of a communication system according to a second embodiment. Of the elements constituting a communication system 4 according to the present embodiment, elements common to the communication system 2 according to the first embodiment are designated by the same reference signs. The communication terminal that shares the communication resource in the communication area 34 is different between the communication system 4 according to the present embodiment and the communication system 2 according to the first embodiment.

In the present embodiment, multiple remote driving vehicles 10A, 10B, and 10C exist in the communication area 34, and other communication terminals do not exist in the communication area 34. That is, in the present embodiment, the communication resource of the base station 32 is shared only by the remote driving vehicles 10A, 10B, and 10C. The remote driving vehicles 10A, 10B, and 10C are connected to the remote cockpits 42A, 42B, and 42C via the remote driving center 40, respectively, and are remotely driven by the remote operators 44A, 44B, and 44C, respectively. Although a telecommunication company exists between the base station 32 and the remote driving center 40 as in the first embodiment, the telecommunication company is not shown in FIG. 4.

The remote driving center 40 includes a remote driving server 410. The remote driving server 410 may be provided in a facility of the remote driving center 40, or may be provided in a cloud. As an example, the remote driving server 410 includes a processor 412 and a memory 414 connected to the processor 412. The memory 414 stores a program 416 that can be executed by the processor 412 and various kinds of information related to the program 416. The program 416 is executed by the processor 412, so that various functions are realized in the remote driving server 410.

The remote driving server 410 manages the remote cockpits 42A, 42B, and 42C. The driving states of the individual remote driving vehicles 10A, 10B, and 10C are controlled from the individual remote cockpits 42A, 42B, and 42C. The remote driving server 410 has a function of adjusting and arbitrating requests issued from the remote cockpits 42A, 42B, and 42C such that the driving states of the remote driving vehicles 10A, 10B, and 10C are optimized as a whole.

2-2. Communication Method

In the communication system 4 having the above configuration, the remote driving vehicles 10A, 10B, and 10C share the communication resource. In this embodiment as well, depending on the relationship between the communication capacity of the base station 32 and the traffic volume of the information to be transmitted, the communication environment in the communication area 34 may deteriorate due to the tight communication resource. In this case, transmission of information required for remote driving of the remote driving vehicles 10A, 10B, and 10C may be delayed, which may cause a difficulty in remote driving.

In the first embodiment, when the decrease in the throughput of the remote driving vehicle is detected or estimated, the communication speeds of the communication terminals other than the remote driving vehicle are reduced, and a margin is generated in the communication resource. However, in the present embodiment, since only the remote driving vehicles 10A, 10B, and 10C exist in the communication area 34, it is not possible to cause the other communication terminals to transfer the communication resource.

Therefore, in the communication method according to the present embodiment, a communication priority is determined between the remote driving vehicles 10A, 10B, and 10C, and the communication resource is preferentially allocated to the remote driving vehicle having a high communication priority. In the present embodiment, the remote driving vehicle having the highest communication priority corresponds to a first vehicle, and the remote driving vehicle other than the remote driving vehicle having the highest communication priority corresponds to a second vehicle to be remotely driven. The communication priority can be determined from various viewpoints as follows.

A first viewpoint of determining the communication priority is social importance of usage of the vehicle. For example, when the social importance is compared between an emergency vehicle such as an ambulance, a public transportation vehicle such as a bus, and a private vehicle, the vehicle with the highest social importance is the emergency vehicle, followed by the public transportation vehicle. The high communication priority is set as the social importance of the vehicle is high. The usage of each remote driving vehicle 10A, 10B, and 10C and the social importance thereof are registered in advance in the remote driving server 410.

A second viewpoint of determining the communication priority is delay allowance for the usage of the vehicle, that is, the degree to which the delay is allowed with respect to the scheduled time or the reserved time. For example, vehicles for commuting to work or school have lower delay allowance than vehicles for daily use. The public transportation vehicles and tourist vehicles also have lower delay allowance than the vehicles for daily use. The high communication priority is set for the vehicle having the low delay allowance. The usage of each remote driving vehicle 10A, 10B, and 10C and the delay allowance thereof are registered in advance in the remote driving server 410.

A third viewpoint of determining the communication priority is a charge class of the vehicle. The user pays a service usage fee to receive the remote driving service. There are several classes for the service usage fee, and the high communication priority is set as the usage fee to be paid is high. That is, in the communication method according to the present embodiment, when the user always wishes to receive a stable remote driving service, the user may select a class in which a higher service usage fee is charged. The charge classes of the remote driving vehicles 10A, 10B, and 10C are registered in advance in the remote driving server 410.

A fourth viewpoint of determining the communication priority is a vehicle speed of the vehicle. The higher the vehicle speed is, the greater the influence of the communication delay on the behavior of the vehicle during remote driving is, and a difficulty in remote driving also increases. Therefore, the high communication priority is set for the vehicle having the high speed. The vehicle speeds of the remote driving vehicles 10A, 10B, and 10C are included in the vehicle state information transmitted to the remote cockpits 42A, 42B, and 42C.

In the communication method according to the present embodiment, the communication resource is preferentially allocated to the remote driving vehicle having the high communication priority, so that the communication speed of the remote driving vehicle having the relatively low communication priority is reduced. As a specific method of reducing the communication speed, the amount of data in the camera image is reduced. The amount of data in the camera image is a value obtained by multiplying the amount of data per frame by the frame rate. Therefore, for the remote driving vehicle having the relatively low communication priority, the number of pixels per frame is reduced or the frame rate is reduced.

Figure 5:
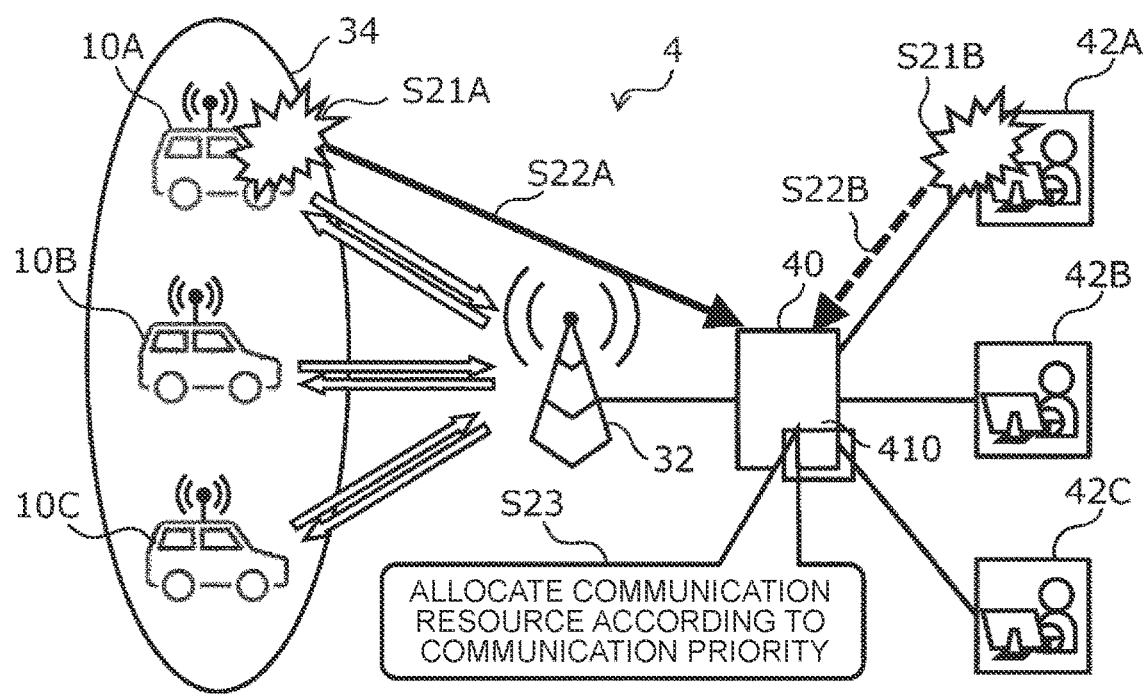
FIG. 5 is a diagram illustrating a communication method according to the second embodiment of the present disclosure.

Hereinafter, the communication method according to the present embodiment will be specifically described with reference to FIGS. 5 and 6.

In the communication method according to the present embodiment, first, the decrease in the throughput of any of the remote driving vehicles 10A, 10B, and 10C in the communication area 34 is detected. In the example shown in FIG. 5, in step S21A, the decrease in the throughput is detected by the communication terminal mounted on the remote driving vehicle 10A. In step S22A, a detection result is transmitted from the remote driving vehicle 10A to the remote driving server 410 of the remote driving center 40 in response to detection of the decrease in the throughput. When the decrease in the throughput is detected in the remote driving vehicle 10A, it can be estimated that the decrease in the throughput is also occurring in the remote driving vehicles 10B and 10C that share the communication resource with the remote driving vehicle 10A.

When the throughput decreases in the remote driving vehicle 10A, the throughput also decreases in the remote cockpit 42A communicating with the remote driving vehicle 10A. Therefore, the decrease in the throughput is detected in the remote cockpit 42A, so that it is possible to estimate the decrease in the throughput of the remote driving vehicle 10A. At the same time, it is also possible to estimate the decrease in the throughput of the remote driving vehicles 10B and 10C that share the communication resource with the remote driving vehicle 10A. Similarly, when the decrease in the throughput is detected in the other remote cockpits 42B and 42C, it is possible to estimate the decrease in the throughput of the remote driving vehicles 10A, 10B, and 10C. In the example shown in FIG. 5, in step S21B, the decrease in the throughput is detected in the remote cockpit 42A. In step S22B, a detection result is transmitted from the remote cockpit 42A to the remote driving server 410 in response to detection of the decrease in the throughput.

In step S23, the remote driving server 410 allocates the communication resource according to the communication priority. Here, it is assumed that the remote driving vehicle 10A is the vehicle having the highest communication priority, the remote driving vehicle 10C is the vehicle having the next highest communication priority, and the remote driving vehicle 10B is the vehicle having the lowest communication priority. In the remote driving server 410, a predetermined number of pixels and a predetermined frame rate are added to the camera image of the remote driving vehicle 10A having the highest communication priority. Then, the remote driving server 410 adjusts the number of pixels and the frame rate to be added to the camera images of the remote driving vehicles 10B and 10C such that the total traffic volume is within the communication capacity.

For example, the remote driving server 410 reduces at least one of the number of pixels and the frame rate to be added to the camera image of the remote driving vehicle 10C such that one of the number of pixels and the frame rate is lower than a specified value. Then, the number of pixels and the frame rate to be added to the camera image of the remote driving vehicle 10B are further reduced so as to be equal to or lower than the number of pixels and the frame rate to be added to the remote driving vehicle 10C. However, when the amount of data in the camera image becomes excessively small, the remote driving itself becomes difficult. In such a case, when the situation permits, remote driving may be stopped to temporarily stop the remote driving vehicle. Here, the remote driving vehicle 10C having the lowest communication priority is temporarily stopped, and the communication resource corresponding to the remote driving vehicle 10C is allocated to the remote driving vehicles 10A and 10B having the higher communication priorities.

Figure 6:
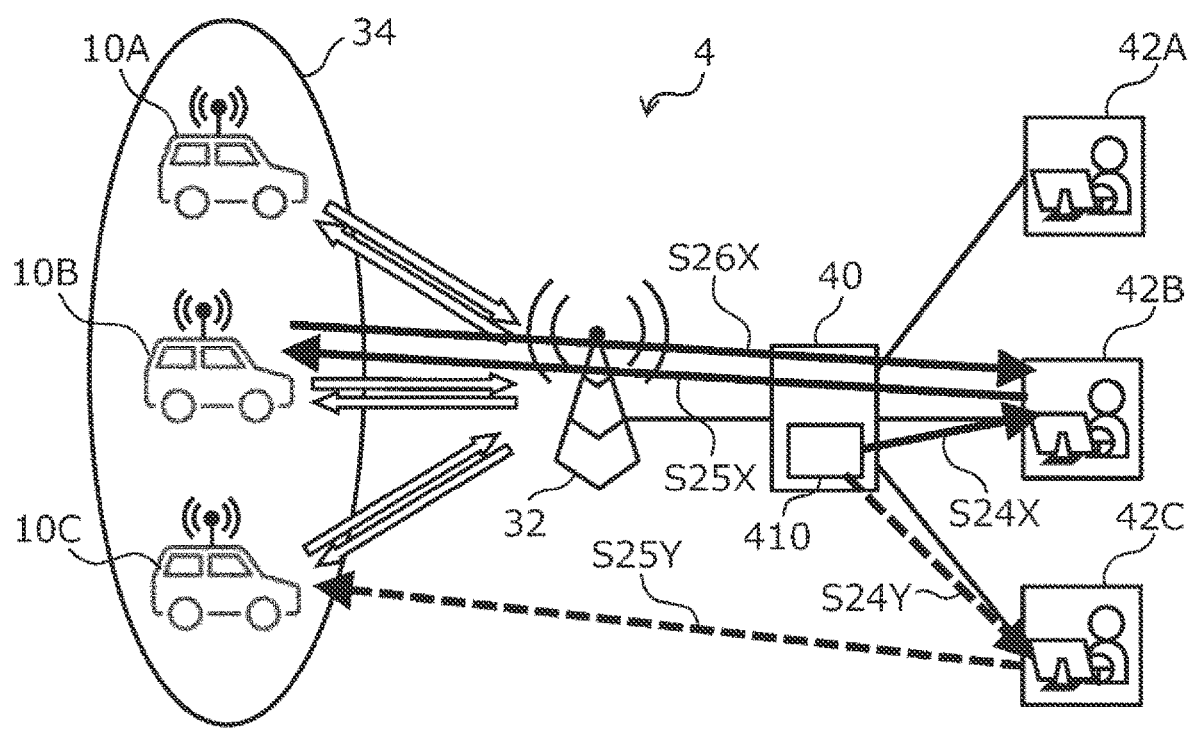
FIG. 6 is a diagram illustrating the communication method according to the second embodiment of the present disclosure.

In the example shown in FIG. 6, in step S24X, the remote driving server 410 instructs the remote cockpit 42B to adjust the number of pixels or the frame rate of the camera image. In step S25X, in response to an instruction from the remote driving server 410, the remote cockpit 42B requests the remote driving vehicle 10B to reduce the number of pixels or the frame rate of the camera image. In step S26X, in response to a request from the remote cockpit 42B, the remote driving vehicle 10B transmits the camera image with the reduced number of pixels or frame rate to the remote cockpit 42B.

Further, in the example shown in FIG. 6, in step S24Y, the remote driving server 410 instructs the remote cockpit 42C to temporarily stop remote driving of the remote driving vehicle 10C. In step S25Y, in response to an instruction from the remote driving server 410, the remote cockpit 42C temporarily stops the remote driving vehicle 10C and stops transmitting the camera image from the remote driving vehicle 10C to the remote cockpit 42C.

When the above process is performed, a margin is generated in the communication resource, and the decrease in the throughput of the remote driving vehicle 10A having the highest communication priority is eliminated or alleviated. That is, with the communication method according to the present embodiment, it is possible to suppress the decrease in the throughput of the remote driving vehicle 10A during remote driving. When the remote driving vehicle 10B also has the same high communication priority as the remote driving vehicle 10A, only the amount of data in the camera image for the remote driving vehicle 10C may be reduced or only the remote driving vehicle 10C may be temporarily stopped to stop transmission of the camera image. The resultant communication resource is allocated to the remote driving vehicles 10A and 10B, so that it is possible to suppress the decrease in the throughput of the remote driving vehicles 10A and 10B.

3. Other Embodiments

In the above embodiment, the communication resource shared between the first communication terminal and the second communication terminal is the communication capacity of the base station 32, but when the communication terminal is connected to the multiple base stations (including satellite base stations), the communication capacity of the network composed of these base stations may be used.

When the communication resource is shared between the multiple remote driving vehicles and smartphones, and it is difficult to reduce the communication speeds of the smartphones, the communication speed of the remote driving vehicle having the low communication priority from among the multiple remote driving vehicles may be reduced or such remote driving vehicles may be temporarily stopped. That is, when it is possible to suppress the decrease in the throughput of the remote driving vehicle having the high communication priority, a target for which the communication speed is reduced is not limited. The present disclosure can be applied to an autonomous driving vehicle.

What is claimed is:

1. A communication method comprising:
    detecting or estimating a decrease in throughput of a first communication terminal mounted on a first vehicle that is remotely driven; and
    reducing a communication speed of a second communication terminal with which the first communication terminal shares a communication resource in response to detection or estimation of the decrease in the throughput, wherein the second communication terminal is a communication terminal mounted on a second vehicle that is remotely driven, the first vehicle is a vehicle having a higher communication priority than the second vehicle, and the communication priority is high as delay allowance for usage of the vehicle is low.

2. The communication method according to claim 1, wherein reducing the communication speed of the second communication terminal is stopping communication of the second communication terminal.

3. The communication method according to claim 1, wherein the communication resource is allocated between the first vehicle and the second vehicle according to the communication priority.

4. A communication method comprising:

detecting or estimating a decrease in throughput of a first communication terminal mounted on a first vehicle that is remotely driven; and reducing a communication speed of a second communication terminal with which the first communication terminal shares a communication resource in response to detection or estimation of the decrease in the throughput, wherein the second communication terminal is a communication terminal mounted on a second vehicle that is remotely driven, the first vehicle is a vehicle having a higher communication priority than the second vehicle, and the communication priority is high as a charge class of the vehicle is high.

5. The communication method according to claim 4, wherein reducing the communication speed of the second communication terminal is stopping communication of the second communication terminal.

6. The communication method according to claim 4, wherein the communication resource is allocated between the first vehicle and the second vehicle according to the communication priority.

7. A communication method comprising:

detecting or estimating a decrease in throughput of a first communication terminal mounted on a first vehicle that is remotely driven; and reducing a communication speed of a second communication terminal with which the first communication terminal shares a communication resource in response to detection or estimation of the decrease in the throughput, wherein the second communication terminal is a communication terminal mounted on a second vehicle that is remotely driven, the first vehicle is a vehicle having a higher communication priority than the second vehicle, and the communication priority is high as a vehicle speed of the vehicle is high.

8. The communication method according to claim 7, wherein reducing the communication speed of the second communication terminal is stopping communication of the second communication terminal.

9. The communication method according to claim 7, wherein the communication resource is allocated between the first vehicle and the second vehicle according to the communication priority.

* * * * *